United States Patent
Pan

(10) Patent No.: US 10,469,255 B2
(45) Date of Patent: Nov. 5, 2019

(54) SOFTWARE SECURITY PROTECTION METHOD AND APPARATUS

(71) Applicant: Huawei Technologies Co., Ltd., Shenzhen, Guangdong (CN)

(72) Inventor: Feng Pan, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 10 days.

(21) Appl. No.: 15/712,025

(22) Filed: Sep. 21, 2017

(65) Prior Publication Data

US 2018/0026783 A1    Jan. 25, 2018

Related U.S. Application Data

(63) Continuation of application No. PCT/CN2015/080769, filed on Jun. 4, 2015.

(51) Int. Cl.
| | |
|---|---|
| *H04L 9/08* | (2006.01) |
| *G06F 21/12* | (2013.01) |
| *G06F 21/72* | (2013.01) |
| *H04L 9/32* | (2006.01) |
| *G06F 21/57* | (2013.01) |

(52) U.S. Cl.
CPC ........... *H04L 9/0822* (2013.01); *G06F 21/12* (2013.01); *G06F 21/57* (2013.01); *G06F 21/72* (2013.01); *H04L 9/32* (2013.01)

(58) Field of Classification Search
CPC ......... H04L 9/0822; H04L 9/32; G06F 21/12; G06F 21/57; G06F 21/72
USPC ...................................................... 713/150
See application file for complete search history.

(56) References Cited

U.S. PATENT DOCUMENTS

| | | | | |
|---|---|---|---|---|
| 6,195,432 | B1* | 2/2001 | Takahashi | G06F 21/10 380/277 |
| 9,535,680 | B2* | 1/2017 | Elmoalem | G06F 8/65 |
| 2007/0028120 | A1* | 2/2007 | Wysocki | G06F 21/10 713/192 |

(Continued)

FOREIGN PATENT DOCUMENTS

| | | |
|---|---|---|
| CN | 101539977 A | 9/2009 |
| CN | 101539978 A | 9/2009 |

(Continued)

OTHER PUBLICATIONS

Office Action, dated Jun. 24, 2019, in Chinese Application No. 201580047857.1 (8 pp.).

*Primary Examiner* — Khalil Naghdali

(74) *Attorney, Agent, or Firm* — Staas & Halsey LLP

(57) ABSTRACT

A software security protection method and apparatus are disclosed, which are applied to a server. The method includes: receiving a software obtaining request of a small cell, where the software obtaining request includes information about a software package requested by the small cell; decrypting, according to a first key, the software package requested by the small cell; establishing an encrypted transmission channel between the server and the small cell; and sending the decrypted software package to the small cell through the encrypted transmission channel for the small cell to encrypt the software package according to a second key. This can resolve a problem that a software key is easily leaked and security is relatively low.

6 Claims, 5 Drawing Sheets

(56) References Cited

U.S. PATENT DOCUMENTS

| | | | | |
|---|---|---|---|---|
| 2008/0184038 A1* | 7/2008 | Fitton | ............ | G06F 9/4405 |
| | | | | 713/187 |
| 2009/0259838 A1* | 10/2009 | Lin | ............ | H04L 9/3271 |
| | | | | 713/150 |
| 2014/0086411 A1* | 3/2014 | Nagai | ............ | H04L 9/0816 |
| | | | | 380/255 |
| 2014/0259004 A1 | 9/2014 | Devarajan et al. | | |
| 2014/0344581 A1* | 11/2014 | Grieco | ............ | G09C 1/00 |
| | | | | 713/176 |
| 2016/0149709 A1* | 5/2016 | Nix | ............ | H04W 4/70 |
| | | | | 713/176 |

FOREIGN PATENT DOCUMENTS

| | | | |
|---|---|---|---|
| CN | 102291418 A | 12/2011 | |
| CN | 103235907 A | 8/2013 | |
| GB | 2520635 A | 5/2015 | |
| JP | 2004094616 A | 3/2004 | |
| JP | 2010067018 A | 3/2010 | |
| JP | 2013126188 A | 6/2013 | |

* cited by examiner

SOFTWARE SECURITY PROTECTION METHOD AND APPARATUS

CROSS-REFERENCE TO RELATED APPLICATIONS

This application is a continuation of International Application No. PCT/CN2015/080769, filed on Jun. 4, 2015, the disclosure of which is hereby incorporated by reference in its entirety.

TECHNICAL FIELD

The present application relates to the security field, and in particular, to a software security protection method and apparatus.

BACKGROUND

A wireless communications network is a development trend of communications technologies. The wireless communications network includes multiple types of wireless communications base stations. The wireless communications base stations may be classified into macro base stations and small cells according to deployment positions of the wireless communications base stations. A macro base station is installed in a cabinet in most cases, and is usually deployed in an equipment room. Similar to a wireless router used in a home or an enterprise, a wireless access device deployed in a building, and or the like, a small cell is usually deployed in an enterprise, a home, or a building.

A program software package is required for running of a small cell, and during a system upgrade, a corresponding upgrade software package also needs to be obtained. A small cell usually obtains a software package from an operate maintenance center (OMC) server. In the prior art, generally, a method for encrypting a software package on such devices as a small cell is as follows: A decryption key is preset on the small cell before delivery; a device vendor of the small cell encrypts the software package by using an encryption key same as the decryption key, and preconfigures the encrypted software package on the small cell. If a version of the small cell needs to be upgraded, the device vendor of the small cell needs to encrypt a new-version software package and upload the encrypted software package to the OMC server. When the small cell needs to upgrade the software package, the small cell downloads the encrypted software package from the OMC server, and decrypts the encrypted software package by using the preset decryption key to load and run new-version software.

Decryption keys of multiple small cells are the same. Therefore, when a decryption key of one small cell is leaked, decryption keys of the other small cells are leaked at the same time. It is easy for a hacker to intrude into a small cell in a reverse manner and crack or tamper with software of the small cell, or even change the small cell into a rogue base station, causing a serious security incident and possibly a huge economic loss. Moreover, if an encryption key is leaked due to lax internal management by a device vendor of small cells, the decryption keys of all the small cells are also leaked because the encryption keys and the decryption keys are the same, causing a serious security incident.

It can be learned that, in the prior art, the software security protection method for a communications device has some drawbacks, and a software key is easily to be leaked, causing a great security risk.

SUMMARY

In view of this, an objective of embodiments of the present disclosure is to provide a software security protection method, to resolve a problem that a software key is easily to be leaked and security is relatively low.

To resolve the foregoing technical problem, the embodiments of the present disclosure disclose the following technical solutions:

According to a first aspect, a software security protection method is provided, where the method is applied to a server and includes:

receiving a software obtaining request of a small cell, where the software obtaining request includes information about a software package requested by the small cell;

decrypting, according to a first key, the software package requested by the small cell;

establishing an encrypted transmission channel between the server and the small cell; and sending the decrypted software package to the small cell through the encrypted transmission channel, so that the small cell receives the decrypted software package, and encrypts the software package according to a second key.

With reference to the first aspect, in a first possible implementation of the first aspect, the first key is a server preset key, and the second key is a small-cell preset key; and
the first key is different from the second key.

With reference to the first aspect and the first possible implementation of the first aspect, in a second possible implementation of the first aspect, before the receiving a software obtaining request of a small cell, the method further includes:

encrypting a software package on the server according to the first key and storing the encrypted software package.

According to a second aspect, a software security protection method is disclosed, where the method is applied to a small cell and includes:

obtaining information about a required software package;

generating a software obtaining request according to the information about the required software package;

sending the software obtaining request to a server;

receiving an unencrypted software package sent by the server through an encrypted transmission channel; and encrypting the software package according to a second key.

With reference to the second aspect, in a first possible implementation of the second aspect, different small cells are corresponding to different second keys.

According to a third aspect, an apparatus is disclosed, where the apparatus is applied to a server and includes:

a receiving unit, configured to receive a software obtaining request of a small cell, where the software obtaining request includes information about a software package requested by the small cell;

a decryption unit, configured to decrypt, according to a first key, the software package requested by the small cell;

a channel establishment unit, configured to establish an encrypted transmission channel between the apparatus and the small cell; and a sending unit, configured to send the decrypted software package to the small cell through the encrypted transmission channel, so that the small cell receives the decrypted software package, and encrypts the software package according to a second key.

With reference to the third aspect, in a first possible implementation of the third aspect, the first key is a server preset key, and the second key is a small-cell preset key; and
the first key is different from the second key.

With reference to the third aspect and the first possible implementation of the third aspect, in a second possible implementation of the third aspect, the apparatus further includes an encryption unit, configured to: before the receiving unit receives the software obtaining request of the small cell, encrypt a software package on the server according to the first key and store the encrypted software package.

According to a fourth aspect, a software security protection apparatus is disclosed, where the apparatus is applied to a small cell and includes:

a requirement obtaining unit, configured to obtain information about a required software package;

a request generation unit, configured to generate a software obtaining request according to the information about the required software package;

a request sending unit, configured to send the software obtaining request to a server;

a software package receiving unit, configured to receive an unencrypted software package sent by the server through an encrypted transmission channel; and a software package encryption unit, configured to encrypt the software package according to a second key.

With reference to the fourth aspect, in a first possible implementation of the fourth aspect, different small cells are corresponding to different second keys.

According to the software security protection method provided in the embodiments of the present disclosure, after receiving the software obtaining request of the small cell, the server decrypts, according to the first key, the software package requested by the small cell, and then sends the decrypted software package to the small cell through the encrypted transmission channel, so that the small cell receives the decrypted software package, and encrypts the software package by using the second key. In the software security protection method of the embodiments of the present disclosure, the encrypted transmission channel is used to transmit the software package, ensuring relatively high security. The first key and the second key may be different, and the second key used on each small cell is different. This lowers a risk of leaking all encryption keys of software and further improves security performance of a system.

It should be understood that the foregoing general descriptions and the following detailed descriptions are only used as examples and do not limit the protection scope of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following descriptions show merely some embodiments of the present disclosure, and a person of ordinary skill in the art may still derive other drawings from these accompanying drawings without creative efforts.

The foregoing accompanying drawings show specific embodiments of the present disclosure, and more detailed descriptions are provided in the following. The accompanying drawings and text descriptions are not intended to limit the scope of the idea of the present disclosure in any manner, but are intended to describe the concepts of the present disclosure to a person skilled in the art with reference to particular embodiments.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

To make the present disclosure understood comprehensively, the following detailed descriptions give many details. However, a person skilled in the art should know that the present disclosure may be implemented without these specific details. In another embodiment, detailed descriptions of well-known methods, processes, components, and circuits are omitted to avoid unnecessary ambiguity of the embodiments.

The embodiments of the present disclosure provide a software security protection method and a software security protection apparatus, to lower a software key leakage risk and improve security performance.

Figure 1:
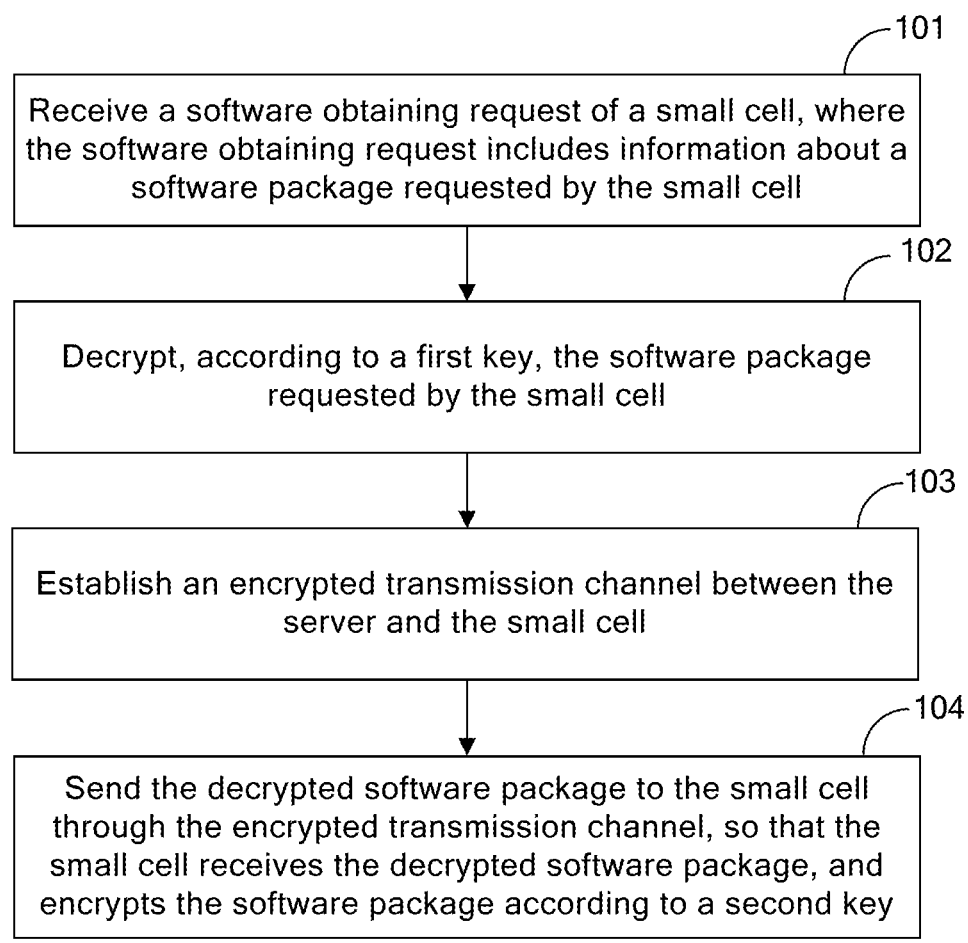
FIG. 1 is a flowchart of a software security protection method according to an embodiment of the present disclosure.

FIG. 1 is a flowchart of a software security protection method according to an embodiment of the present disclosure. As shown in FIG. 1, the method is applied to a server, and the method includes the following steps.

Step 101: Receive a software obtaining request of a small cell, where the software obtaining request includes information about a software package requested by the small cell.

The software package requested by the small cell may be a program software package used during initialized running of the small cell, or an upgrade package used during a system upgrade, or another software package.

Step 102: Decrypt, according to a first key, the software package requested by the small cell.

The first key is a server preset key, which may be preset by a device vendor before delivery, or set by an operator. The first key may be updated and reset by the operator. After the first key is changed, the operator needs to notify the device vendor, and the device vendor uses the first key to encrypt a new-version software package or a software patch and provides the encrypted software package or software patch to the operator for implementing a small cell software upgrade.

Step 103: Establish an encrypted transmission channel between the server and the small cell.

Step 104: Send the decrypted software package to the small cell through the encrypted transmission channel, so that the small cell receives the decrypted software package, and encrypts the software package according to a second key.

The second key is a small-cell preset key, which may be preset by the device vendor before delivery, or set by the operator, or randomly generated by each small cell, so as to ensure a different second key for each small cell and also prevent a leakage risk due to an exposure of the second key to production personnel of the device vendor.

The second key may be updated and reset.

The first key is different from the second key.

The first key is different from the second key. Even if the second key of the small cell is leaked, security of software on the server is not affected. In another embodiment of the present disclosure, a server is connected to multiple small cells, and each small cell has a different second key. Even if a second key of one small cell is leaked, security of software on the other small cells is not threatened. Using an encrypted transmission channel to transmit a software package can further improve security performance.

According to the software security protection method in this embodiment of the present disclosure, the software package requested by the small cell is decrypted according to the first key, and then the decrypted software package is sent to the small cell through the encrypted transmission channel, so that the small cell receives the decrypted software package, and encrypts the software package by using the second key. In the software security protection method of this embodiment of the present disclosure, the encrypted transmission channel is used to transmit the software package, ensuring relatively high security. The first key and the second key may be different. This lowers a risk of leaking all encryption keys of software and further improves security performance of a system.

In the method of this embodiment of the present disclosure, before step 101, the method further includes: encrypting a software package on the server according to the first key and storing the encrypted software package.

Encrypting the software package on the server and storing the encrypted software package can further improve software security.

Figure 2:
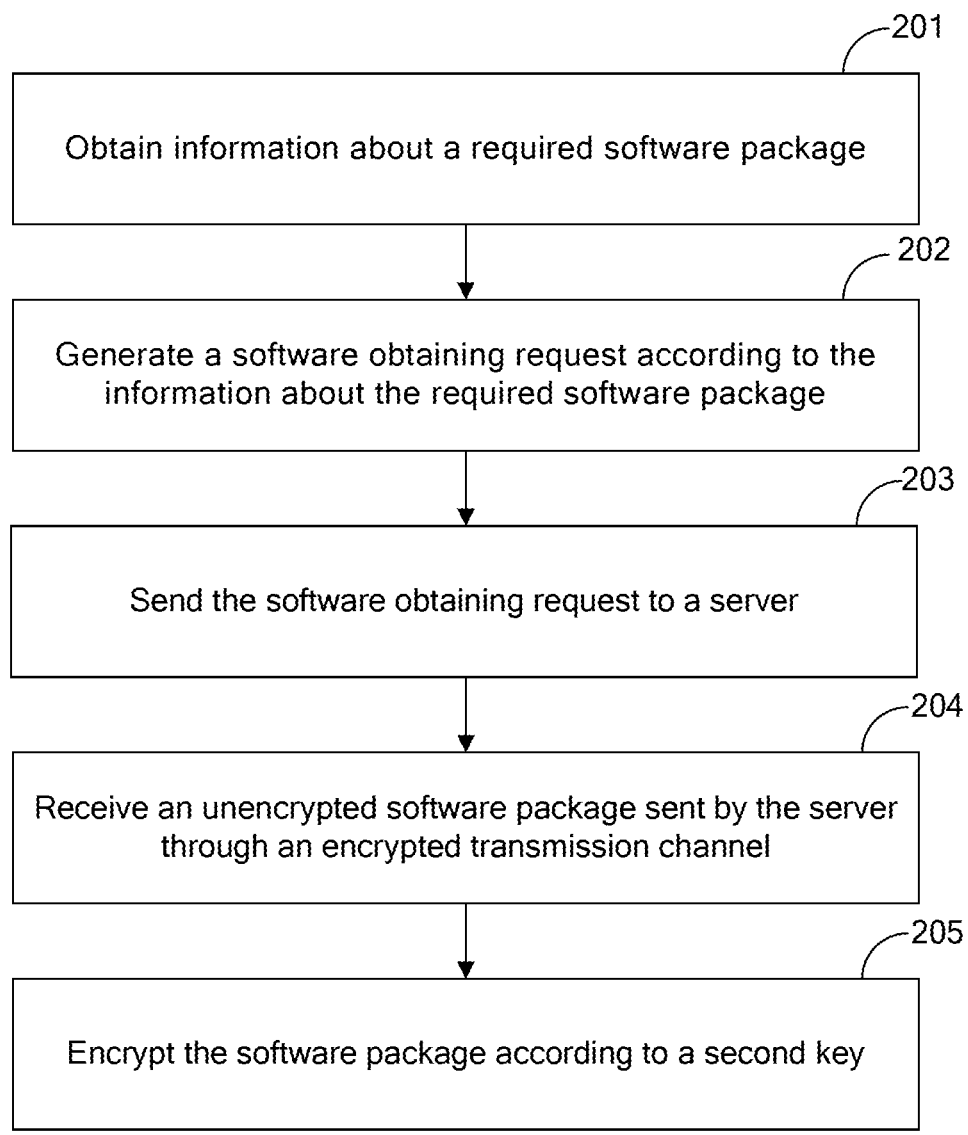
FIG. 2 is a flowchart of a software security protection method according to an embodiment of the present disclosure.

FIG. 2 is a flowchart of a software security protection method according to an embodiment of the present disclosure. The method is applied to a small cell, as shown in FIG. 2, and the method includes the following steps.

Step 201: Obtain information about a required software package.

Step 202: Generate a software obtaining request according to the information about the required software package.

Step 203: Send the software obtaining request to a server.

Step 204: Receive an unencrypted software package sent by the server through an encrypted transmission channel.

Step 205: Encrypt the software package according to a second key.

If a communications system has multiple small cells, different small cells are corresponding to different second keys.

According to the software security protection method in this embodiment of the present disclosure, the small cell receives the software package sent by the server through the encrypted transmission channel, and encrypts the software package by using the second key. This can improve software security. Different small cells are corresponding to different second keys. Even if a second key of one small cell is leaked, security of software on the other small cells is not affected.

Figure 3:
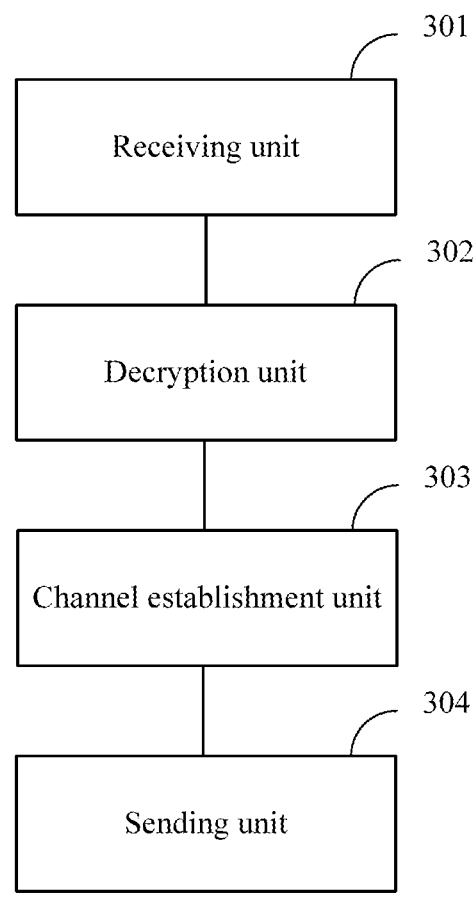
FIG. 3 is a schematic structural diagram of a software security protection apparatus according to an embodiment of the present disclosure.

FIG. 3 is a schematic structural diagram of a software security protection apparatus according to an embodiment of the present disclosure. As shown in FIG. 3, the apparatus includes:

a receiving unit 301, configured to receive a software obtaining request of a small cell, where the software obtaining request includes information about a software package requested by the small cell;

a decryption unit 302, configured to decrypt, according to a first key, the software package requested by the small cell;

a channel establishment unit 303, configured to establish an encrypted transmission channel between the apparatus and the small cell; and a sending unit 304, configured to send the decrypted software package to the small cell through the encrypted transmission channel, so that the small cell receives the decrypted software package, and encrypts the software package according to a second key.

Optionally, the first key is a server preset key, and the second key is a small-cell preset key; and the first key is different from the second key.

Optionally, the apparatus further includes an encryption unit, configured to: before the receiving unit receives the software obtaining request of the small cell, encrypt a software package on the server according to the first key and store the encrypted software package.

According to the software security protection apparatus in this embodiment of the present disclosure, the software package requested by the small cell is decrypted according to the first key, and then the decrypted software package is sent to the small cell through the encrypted transmission channel, so that the small cell receives the decrypted software package, and encrypts the software package by using the second key. This ensures relatively high security. The first key and the second key may be different. This lowers a risk of leaking all encryption keys of software and further improves security performance of a system.

Figure 4:
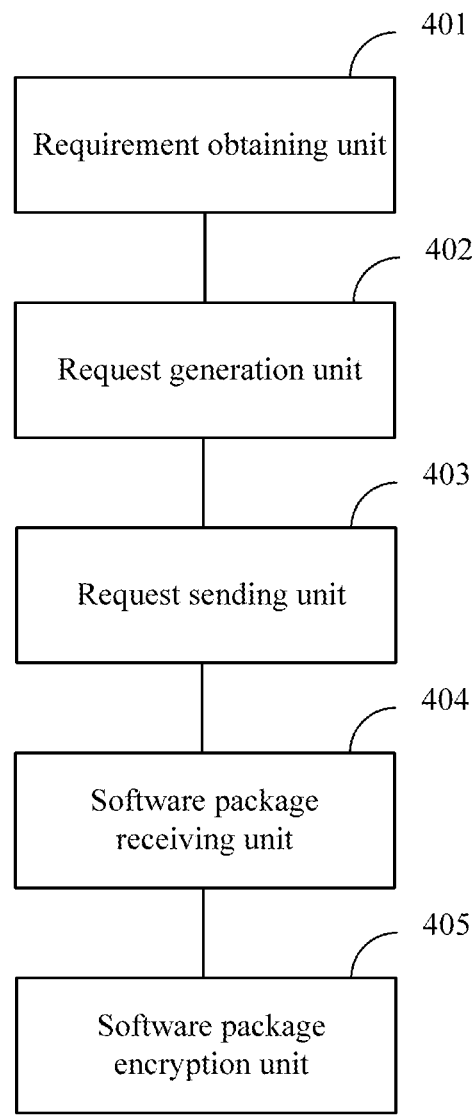
FIG. 4 is a schematic structural diagram of a software security protection apparatus according to an embodiment of the present disclosure.

FIG. 4 is a schematic structural diagram of a software security protection apparatus according to an embodiment of the present disclosure. As shown in FIG. 4, the apparatus includes:

a requirement obtaining unit 401, configured to obtain information about a required software package;

a request generation unit 402, configured to generate a software obtaining request according to the information about the required software package;

a request sending unit 403, configured to send the software obtaining request to a server;

a software package receiving unit 404, configured to receive an unencrypted software package sent by the server through an encrypted transmission channel; and a software package encryption unit 405, configured to encrypt the software package according to a second key.

Different small cells are corresponding to different second keys.

According to the apparatus in this embodiment of the present disclosure, the small cell receives the software package sent by the server through the encrypted transmission channel, and encrypts the software package by using the second key. This can improve software security. Different small cells are corresponding to different second keys. Even if a second key of one small cell is leaked, security of software on the other small cells is not affected.

Figure 5:
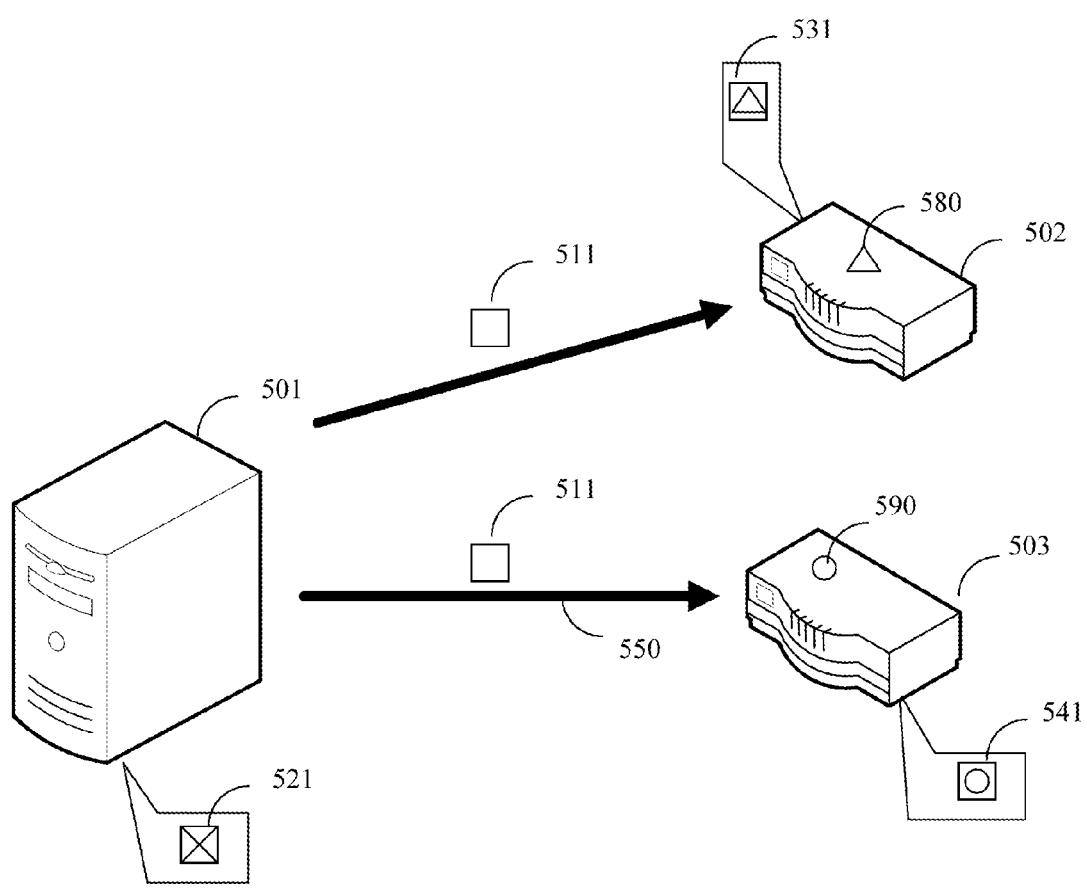
FIG. 5 is a schematic diagram of an application scenario of the present disclosure.

FIG. 5 is a schematic diagram of an application scenario of an embodiment of the present disclosure. As shown in FIG. 5, a server 501 stores multiple software packages, and the software packages on the server are encrypted by using a first key. After being encrypted, a software package 511 is stored on the server in a form of a software package 521.

A small cell 502 sends a software obtaining request to the server 501 for obtaining the software package 511.

The server 501 learns, according to the software obtaining request, that an encrypted software package corresponding to the software package 511 is the software package 521. After decrypting the software package 521, the server obtains the software package 511, and sends the unencrypted software package 511 to the small cell 502 through an encrypted transmission channel 550 between the server 501 and the small cell 502.

After receiving the unencrypted software package 511, the small cell encrypts the software package 511 as a software package 531 by using a key 580 on the small cell 502, and stores the encrypted software package 531.

A small cell 503 also requests the software package 511. After receiving the software package 511, the small cell 503 encrypts the software package 511 as a software package 541 by using a key 590 on the small cell 503, and stores the software package 541.

For ease of differentiation and demonstration, in FIG. 5, different graphs are used to represent the unencrypted software package 511 and the software packages 521, 531, and 541 encrypted by using different keys. In addition, different graphs are used to represent the different keys, for example, the key 580 and the key 590. Actually, the software packages and keys all exist in the form of software, code, or character strings and are invisible.

According to this embodiment of the present disclosure, the small cell receives the software package 511 sent by the server through the encrypted transmission channel, and encrypts the software package by using the second key. This can improve software security. Different small cells are corresponding to different second keys. Even if a second key of one small cell is leaked, security of software on the other small cells is not affected.

According to the software security protection method and the software security protection apparatus provided in the embodiments of the present disclosure, after receiving the software obtaining request of the small cell, the server decrypts, according to the first key, the software package requested by the small cell, and then sends the decrypted software package to the small cell through the encrypted transmission channel, so that the small cell receives the decrypted software package, and encrypts the software package by using the second key. In the software security protection method of the embodiments of the present disclosure, the encrypted transmission channel is used to transmit the software package, ensuring relatively high security. The first key and the second key may be different, and the second key used on each small cell is different. This lowers a risk of leaking all encryption keys of software and further improves security performance of a system.

A system embodiment basically corresponds to a method embodiment. For related parts, reference may be made to the parts in the method embodiment. The described system embodiment is merely exemplary. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present disclosure without creative efforts.

The present disclosure can be described in the general context of executable computer instructions executed by a computer, for example, a program module. Generally, the program unit includes a routine, program, object, component, data structure, and the like for executing a particular task or implementing a particular abstract data type. The present disclosure may also be practiced in distributed computing environments in which tasks are performed by remote processing devices that are connected through a communications network. In a distributed computing environment, program modules may be located in both local and remote computer storage media including storage devices.

A person of ordinary skill in the art may understand that all or a part of the steps of the method embodiments may be implemented by a program instructing relevant hardware. The program may be stored in a computer readable storage medium, such as a ROM, a RAM, a magnetic disk, or an optical disc.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely examples of embodiments of the present disclosure, but are not intended to limit the protection scope of the present disclosure. Specific examples are used in this specification to describe the principle and implementations of the present disclosure. The descriptions of the foregoing embodiments are merely intended to help understand the method and core idea of the present disclosure. In addition, a person of ordinary skill in the art may, according to the idea of the present disclosure, make modifications with respect to the specific implementations and the application scope. Therefore, the content of this specification shall not be construed as a limitation on the present disclosure. Any modification, equivalent replacement, or improvement made without departing from the spirit and principle of the present disclosure shall fall within the protection scope of the present disclosure.

What is claimed is:

1. A software security protection method for use by a server, the method comprising:

receiving a software obtaining request from a small cell, wherein the software obtaining request comprises information about a software package requested by the small cell;

decrypting, according to a first key, the software package requested by the small cell;

establishing an encrypted transmission channel between the server and the small cell; and sending, through the encrypted transmission channel, the decrypted software package to the small cell for encrypting the software package according to a second key, wherein the first key is a server preset key, and the second key is a small-cell preset key; and the first key is different from the second key.

2. The method according to claim 1, wherein before receiving the software obtaining request of the small cell, the method further comprises:

encrypting the software package according to the first key and storing the encrypted software package.

3. A software security protection method for use by a small cell, the method comprising:
obtaining information about a required software package;
generating a software obtaining request according to the information about the required software package;
sending the software obtaining request to a server;
receiving an unencrypted software package from the server through an encrypted transmission channel; and
encrypting the software package according to a second key,
wherein different small cells correspond to different second keys.

4. A software security protection apparatus, comprising:
a processor and a non-transitory computer readable storage medium, wherein the non-transitory computer readable storage medium stores a program, and when the processor executes the program, the apparatus is configured to:
receive a software obtaining request from a small cell, wherein the software obtaining request comprises information about a software package requested by the small cell;
decrypt, according to a first key, the software package requested by the small cell;
establish an encrypted transmission channel between the apparatus and the small cell; and
send, through the encrypted transmission channel, the decrypted software package to the small cell for encrypting the software package according to a second key, wherein
the first key is a server preset key, and the second key is a small-cell preset key; and
the first key is different from the second key.

5. The apparatus according to claim 4, wherein before receiving the software obtaining request of the small cell, the apparatus is configured to:
encrypt the software package according to the first key and store the encrypted software package.

6. A software security protection apparatus, comprising:
a processor and a non-transitory computer readable storage medium, wherein the non-transitory computer readable storage medium stores a program, and when the processor executes the program, the apparatus is configured to:
obtain information about a required software package;
generate a software obtaining request according to the information about the required software package;
send the software obtaining request to a server;
receive an unencrypted software package from the server through an encrypted transmission channel; and
encrypt the software package according to a second key,
wherein different small cells correspond to different second keys.

* * * * *